United States Patent [19]

Tezuka

[11] Patent Number: 4,528,473

[45] Date of Patent: Jul. 9, 1985

[54] PERMANENT MAGNET TYPE STEP MOTOR

[75] Inventor: Katsue Tezuka, Ueda, Japan

[73] Assignee: Shinano Kenshi Kabushiki Kaisha, Nagano, Japan

[21] Appl. No.: 583,257

[22] Filed: Feb. 24, 1984

[30] Foreign Application Priority Data

Feb. 26, 1983 [JP] Japan ............... 58-26554[U]

[51] Int. Cl.³ ............................................. H02K 1/12
[52] U.S. Cl. ..................... 310/256; 310/49 A; 310/156; 310/89; 310/90; 336/84 R
[58] Field of Search ............ 310/156, 49 A, 49 R, 310/162, 43, 40 MM, 263, 89, 90, 256; 336/84 R, 84 C

[56] References Cited

U.S. PATENT DOCUMENTS

| | | | |
|---|---|---|---|
| 3,206,623 | 9/1965 | Snowdon | 310/49 R |
| 3,711,732 | 1/1973 | Gerber | 310/162 |
| 3,801,842 | 4/1974 | Touchman | 310/49 R |
| 4,170,057 | 10/1979 | Roddy et al. | 310/89 |
| 4,205,247 | 5/1980 | Brammerlo | 310/256 |

FOREIGN PATENT DOCUMENTS

| | | | |
|---|---|---|---|
| 986568 | 3/1976 | Canada | 310/256 |
| 2147361 | 5/1973 | Fed. Rep. of Germany | 310/49 R |

Primary Examiner—R. Skudy
Attorney, Agent, or Firm—Robert E. Burns; Emmanuel J. Lobato; Bruce L. Adams

[57] ABSTRACT

A permanent magnet type step motor comprising a rotor wherein a disc-like permanent magnet having a magnetic pole in an axial direction and a pair of rotor yokes holding the permanent magnet therebetween are integrally and coaxially mounted on a rotational shaft, and a stator having a stator core opposed to an outer circumference of the rotor yokes. The front and rear brackets are formed of a non-magnetic material in which a thin shield sheet of magnetic material is inserted therein, and the magnetic resistance between the rotor yokes and the ends of the brackets opposed thereto is increased to reduce the leaky magnetic flux from the motor.

13 Claims, 1 Drawing Figure

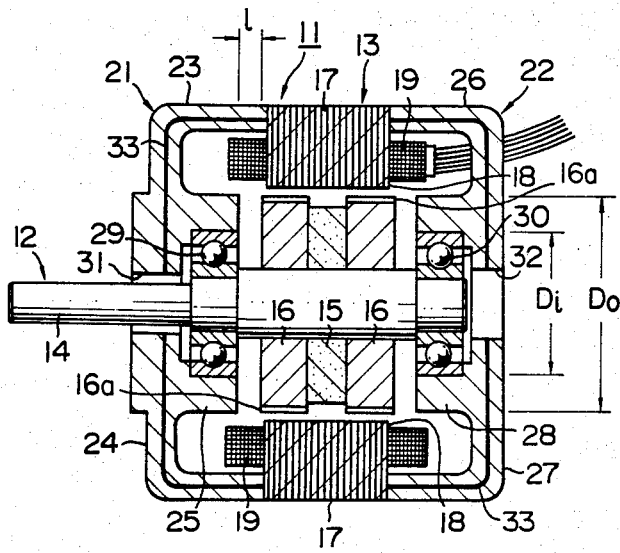

PERMANENT MAGNET TYPE STEP MOTOR

FIELD AND BACKGROUND OF THE INVENTION

The present invention relates to a permanent magnet type step motor, and more specifically, to a permanent magnet type step motor which can considerably reduce the leakage of magnetic flux to the exterior thereof.

A permanent magnet type step motor, which includes a permanent magnet in a magnetic path and in which a rotational shaft is rotated and driven stepwise by synthesization with a magnetomotive force of a stator winding, has been heretofore extensively known for use as a step motor, for example, for driving a magnetic head of a magnetic disc device. However, where such a permanent magnet type step motor is used for the magnetic disc device, if the leakage magnetic flux from the motor is great, the magnetic disc is adversely affected. In view of the foregoing, it has been to arrange brackets on either side of a stator core to constitute an outer case formed of a magnetic material.

However, according to the above-described construction, since the whole bracket including a bearing housing is formed of a magnetic material, the construction suffers the disadvantage that magnetic flux from the permanent magnet tends to concentrate on the brackets, as a consequence of which the magnetic flux density of the bracket portion increases and the leakage magnetic flux from the bracket increases accordingly. Further disadvantages of such a construction include that the brackets tend to be heavy thereby making it difficult to form a step motor of smaller size and of light-weight configuration.

OBJECTS OF THE INVENTION

It is an object of the present invention to provide a permanent magnet type step motor which considerably reduces the leakage magnetic flux from the brackets to the exterior.

It is another object of the present invention to provide a permanent magnetic type step motor in which brackets are formed of aluminum, zinc, synthetic resin, etc. to make it possible to provide a light-weight configuration.

In accordance with the present invention, there is provided a permanent magnet type step motor which comprises a rotor wherein a disc-like permanent magnet having a magnetic pole in an axial direction and a pair of rotor yokes holding the permanent magnet therebetween are integrally and coaxially mounted on a rotational shaft, and a stator having a stator core opposed to an outer circumference of said rotor yokes, said stator being coaxially held on the rotational shaft by front and rear brackets, said front and rear brackets being formed of a non-magnetic material in which a thin magnetic shield sheet is inserted interiorly thereof.

According to a preferred embodiment of the present invention, the front and rear brackets respectively comprise a cylindrical portion, a side portion for closing an opening at one end of the cylindrical portion, and a collar portion provided in an inner central portion of the side portion so as to constitute a bearing housing. These brackets are formed of a non-magnetic material such as aluminum, zinc, synthetic resin, etc., and a shield sheet formed of a non-magnetic material is inserted into the cylindrical portion and the side portion.

With this arrangement, magnetic resistance between the rotor yokes and the ends of the brackets opposed to the yokes can be increased to reduce the leakage magnetic flux from the motor. Also, it is possible to reduce the weight of the motor by forming the front and rear brackets of light-weight non-magnetic material such as aluminum, zinc, etc.

BRIEF DESCRIPTION OF THE DRAWINGS

The single drawing is a longitudinal sectional view showing one embodiment of a permanent magnet type step motor in accordance with the present invention.

DESCRIPTION OF THE PREFERRED EMBODIMENT

In the FIGURE, a permanent magnet type step motor of the present invention is generally indicated at reference numeral 11. This step motor 11 comprises a rotor 12 and a stator 13. The rotor 12 comprises a disc-like permanent magnet 15 mounted on a rotational shaft 14 and coaxially mounted thereon, and a pair of rotor yokes 16 likewise coaxially mounted on the rotational shaft 14 so as to hold the permanent magnet 15 therebetween. The permanent magnet 15 is axially magnetized and opposed surfaces thereof are magnetized to form an N-pole and S-pole, respectively. The pair of rotor yokes 16 are respectively formed from a magnetic body in the form of a spur gear having about its circumferential surface a set of gear teeth 16a. As shown in the drawing, the gear teeth 16a are disposed circumferentially around the rim of the rotor yokes 16. The stator 13 has a stator core 17 formed from a laminated iron plate whose center is annularly punched, the core being formed in its inner circumferential surface with a plurality of pole teeth 18 which have a drive coil 19 wound thereon. An end in the center of each pole tooth 18 is opposed to the outer circumferential surface of the rotor yoke 16 through a slight gap. The stator core 17 has opposite axial ends coaxially supported on the rotational shaft 14 by a front bracket or casing section 21 and a rear bracket or casing section 22. The front bracket is integrally formed with a cylindrical portion 23 having one end in contact with the core 17, a disc-like side portion 24 for closing the other end of the cylindrical portion 23, and a collar portion 25 provided on the inner center portion of the side portion 24 so as to constitute a bearing housing. The rear bracket 22 is integrally formed with a cylindrical portion 26, a side portion 27 and a collar portion 28 similar to the corresponding portions of the front bracket 21. Within the collar portions 25, 28 are respectively mounted bearings 29, 30 for rotatably supporting the rotational shaft 14 at the center positions of the side portions 24, 27 of the front and rear brackets 21, 22. Thus, the side portions 24, 27 are respectively formed in their center portions with openings 31, 32 through which the rotational shaft 14 extends. The thus constructed permanent magnet type step motor is well known and the operation thereof is also widely known. Therefore, an explanation of the operation thereof will be omitted.

In the present invention, in such a construction as described above, the front and rear brackets 21, 22 are formed of a non-magnetic material such as aluminum zinc, synthetic resin, etc., and a thin shield sheet 33 formed from a magnetic body is inserted into the aforesaid non-magnetic material of which the outer circumferential cylindrical portions 23, 26 and side portions 24, 27 are formed.

Next, the magnetic resistance R between the rotor yokes 16 and the ends of the collar portions 25, 28 constituting the bearing housing will be explained in connection with the conventional permanent magnetic type step motor. If $D_o$ represents the outside diameter of the collar portions 25, 28 of the front and rear brackets 21, 22, $D_i$ represents the inside diameter thereof, $l$ represents the axial distance between each of the ends of the collar portions 25, 28 and the rotor yokes 16, and $\mu_o$ represents the permeability of air, and for the purpose of this explanation, the permeability of the magnetic material of which the front and rear brackets 21, 22 are formed is infinite, the aforementioned magnetic resistance R is given by $$R = \frac{4l}{\mu_o \pi (D_o^2 - D_i^2)}$$

To decrease the absolute value of the magnetic flux passing through the front and rear brackets 21, 22, it is necessary to increase the value of the magnetic resistance is large. To increase the magnetic resistance, the value of $l$ can be made larger or the value of $(D_o^2 - D_i^2)$ made smaller.

However, the value of $l$ is limited by the size of the motor, and therefore, it cannot be made excessively large. Also, if the value of $(D_o^2 - D_i^2)$ is made small, the thickness of the collars 25, 28 becomes small, and as the collar portions are provided to firmly support the bearings 29, 30, the collar portions cannot therefore be made unlimitedly small. Moreover, since the front and rear brackets 21, 22 including the collar portions 25, 28 are formed entirely of a magnetic material, a magnetic path is thereby formed and a leakage magnetic flux to the exterior tends to occur.

Conversely to the conventional construction as described above, in the present invention, the front and rear brackets or casing sections 21, 22 are formed of a non-magnetic material, and a thin shield sheet 33 formed of a magnetic material is inserted into and completely embedded within the interior thickness of only the cylindrical portions 23, 26 of the brackets and the side portions 24, 27 so as to cover these cylindrical portions and side portions, and the thin shield sheet 33 does not extend into the collar portions 25,28. By such a construction, the collar portions 25, 28 are formed solely of a non-magnetic material, whereby the magnetic resistance between the rotor yokes 16 and the ends of the collar portions 25, 28 can be increased. Thus, the number of magnetic flux lines along a magnetic path comprising one rotor yoke 16-front bracket 21-stator core 17-rear bracket 22-the other rotor yoke 16 is considerably reduced and the leakage magnetic flux from the front and rear brackets 21, 22 to the exterior can be considerably reduced accordingly.

What is claimed is:

1. A permanent magnet type step motor comprising: a rotor comprised of a disc-like permanent magnet having a magnetic pole in an axial direction thereof and a pair of rotor yokes holding the permanent magnet therebetween such that the rotor and the rotor yokes are integrally and coaxially mounted on a rotational shaft, and a stator having a stator core opposed to an outer circumference of said rotor yokes, said stator being coaxially held with respect to the rotational shaft by front and rear brackets, said front and rear brackets being formed of a non-magnetic material in which a thin magnetic shield sheet is embedded in the interior thickness thereof.

2. A permanent magnet type step motor according to claim 1 wherein said non-magnetic material for said front and rear brackets comprises aluminum, zinc or synthetic resin.

3. A permanent magnet type step motor according to claim 2 wherein said front and rear brackets respectively comprise a cylindrical portion, a side portion for closing an opening at one end of said cylindrical portion, and a collar portion constituting a bearing housing in the inner surface of said side portion.

4. A permanent magnet type step motor according to claim 1 wherein said front and rear brackets respectively comprise a cylindrical portion, a side portion for closing an opening at one end of said cylindrical portion, and a collar portion constituting a bearing housing in the inner surface of said side portion, and wherein said shield material extends into said cylindrical portion and said side portion and does not extend into said collar portion.

5. A permanent magnet type step motor according to claim 1 wherein said front and rear brackets respectively comprise a cylindrical portion, a side portion for closing an opening at one end of said cylindrical portion, and a collar portion constituting a bearing housing in the inner surface of said side portion.

6. A step motor comprising: a rotary shaft; a rotor connected to the rotary shaft for rotation therewith; a stator having a set of energizeable drive coils wound thereon and operative in response to energization thereof to rotationally drive the rotor in a stepwise manner; front and rear casing sections connected to the stator and defining a casing which encases the rotor, at least one of the casing sections having bearing means for rotatably mounting the rotary shaft, and the front and rear casing sections being composed of a non-magnetic material; and a thin shield sheet composed of magnetic material completely embedded within the interior thickness of the front and rear casing sections.

7. A step motor according to claim 6; wherein the non-magnetic material of the front and rear casing sections is selected from the group consisting of aluminum, zinc, and synthetic resin.

8. A step motor according to claim 7; wherein the front and rear casing sections each have a cylindrical portion, a side portion connected to and closing one end of the cylindrical portion, and a collar portion connected to and extending inwardly of the side portion; and wherein the thin shield is embedded within the cylindrical and side portions only and not the collar portion of each casing section.

9. A step motor according to claim 8; wherein both the front and rear casing sections have bearing means mounted on the collar portions thereof for rotatably mounting the rotary shaft.

10. A step motor according to claim 9; wherein the front and rear casing sections each comprise a one-piece unitary structure.

11. A step motor according to claim 6; wherein the front and rear casing sections each comprise a one-piece unitary structure.

12. A step motor according to claim 11; wherein the front and rear casing each have a cylindrical portion, a side portion connected to and closing one end of the cylindrical portion, and a collar portion connected to and extending inwardly of the side portion; and wherein the thin shield sheet is embedded within the cylindrical and side portions only and not the collar portion of each casing section.

13. A step motor according to claim 12; wherein both the front and rear casing sections have bearing means mounted on the collar portions thereof for rotatably mounting the rotary shaft.

* * * * *